Patented June 6, 1939

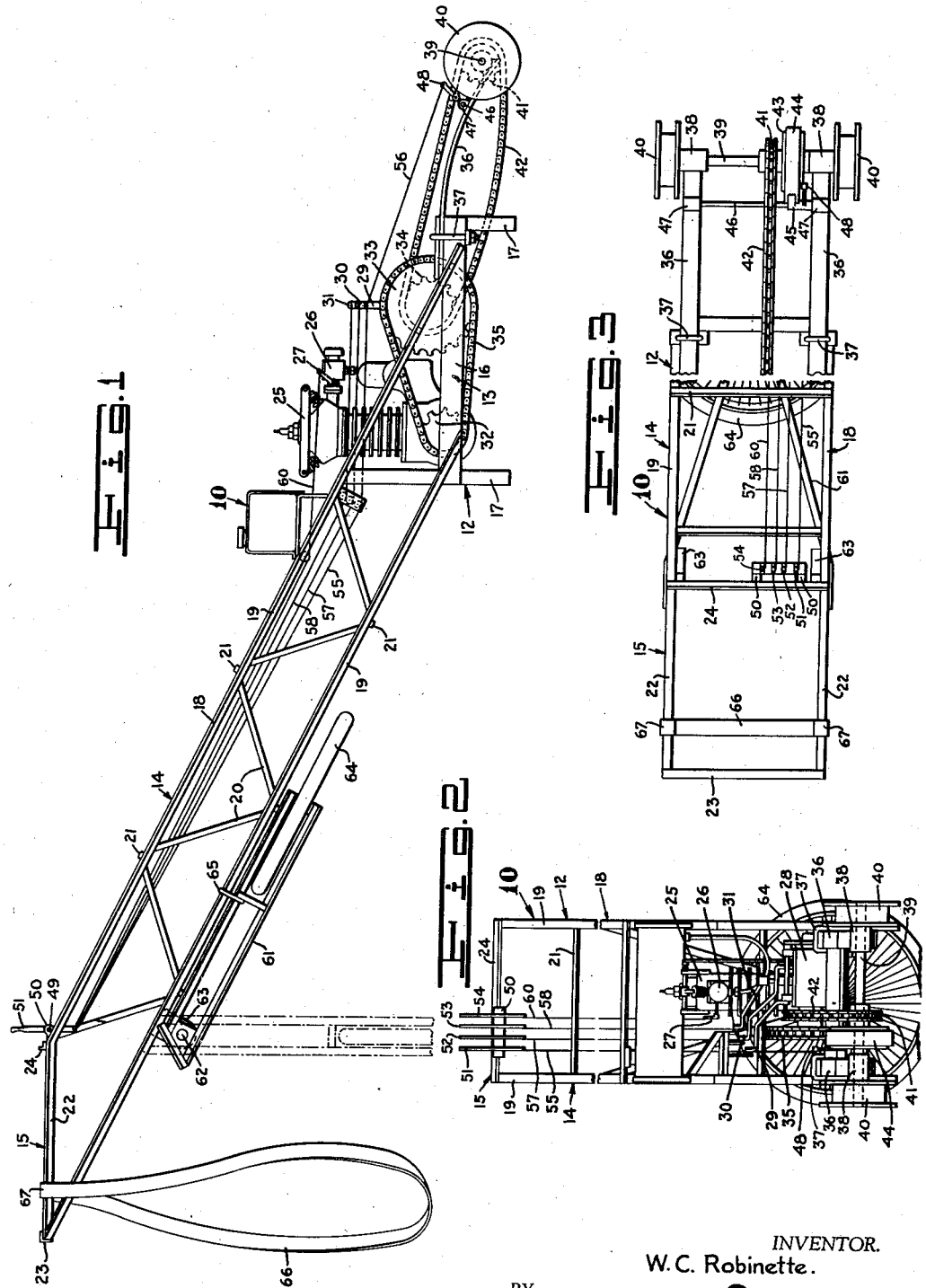

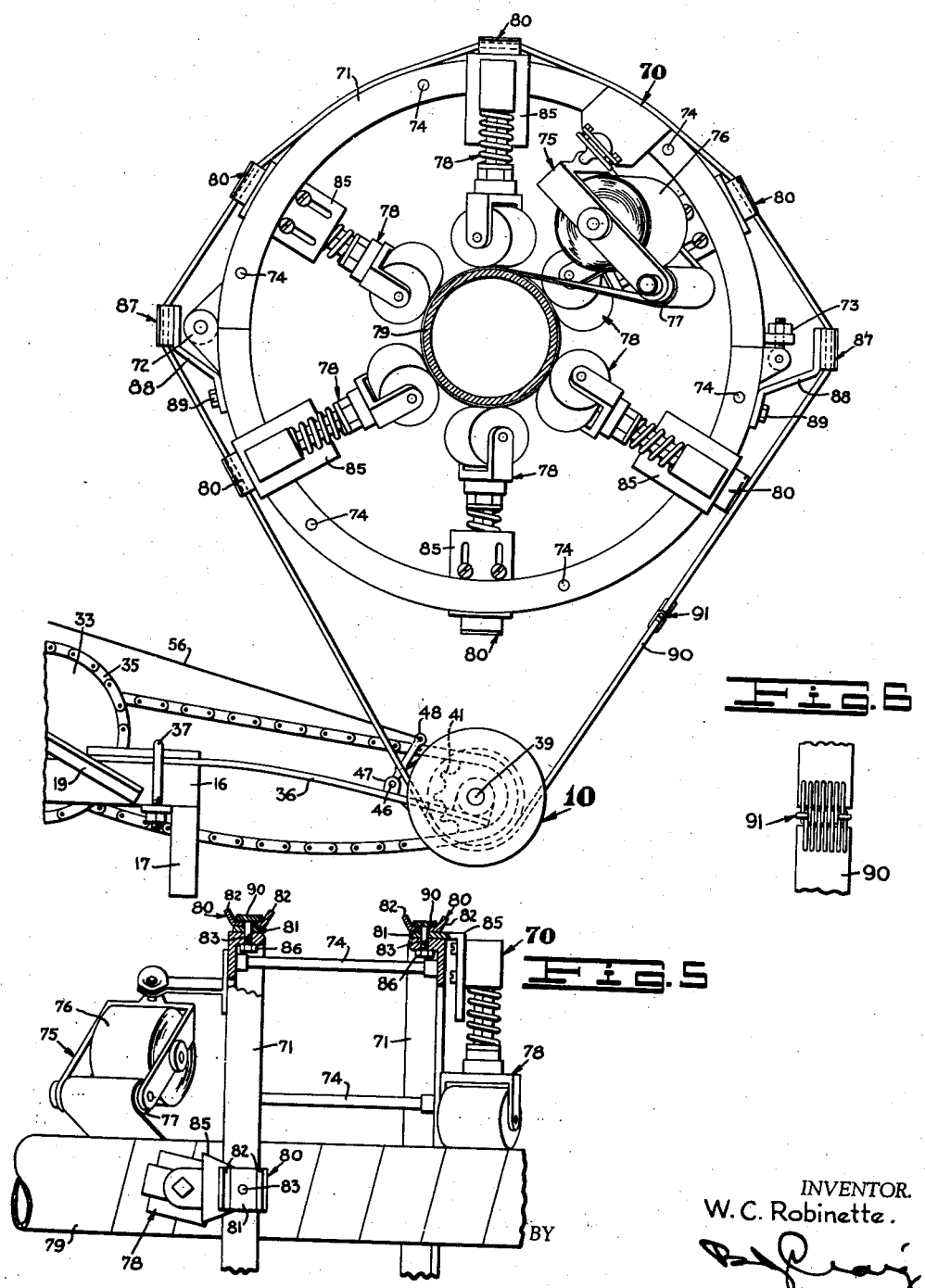

2,161,530

UNITED STATES PATENT OFFICE 2,161,530

PIPE WRAPPING MACHINE

Willard C. Robinette, Pasadena, Calif.

Application November 5, 1937, Serial No. 172,958

3 Claims. (Cl. 242—11)

This invention relates to improvement in pipe wrapping machines.

The general object of the invention is to provide a wrapping machine which is driven in a novel manner.

Another object of the invention is to provide an improved power unit for operating a pipe wrapping device.

Other objects and the advantages of this invention will be apparent from the following description taken in connection with the accompanying drawings, wherein:

Fig. 1 is a side elevation of my improved power unit;

Fig. 2 is a front view of the device shown in Fig. 1;

Fig. 3 is a fragmentary top plan view of the device shown in Fig. 1;

Fig. 4 is an enlarged fragmentary side view of the power unit showing it operatively connected to a pipe wrapping device;

Fig. 5 is a fragmentary front view of the pipe wrapping machine shown in Fig. 4, partly in section; and Fig. 6 is an enlarged fragmentary face view of one of the drive belts showing the separable connection thereof.

Referring to the drawings by reference characters I have indicated my improved power unit generally at 10. As shown the device 10 comprises a frame indicated generally at 12 which includes a horizontal front base portion 13, an intermediate inclined portion 14 and a rear horizontal portion 15.

The base portion 13 includes spaced side channels 16 connected adjacent their forward and rear ends by transverse members 17. The inclined portion 14 includes spaced side members 18 comprising upper and lower angle members 19 vertically connected by brace members 20. The side members 18 are suitably secured to the base channels 16 and are connected together by transverse members 21. At the horizontal rear portion 15 the ends of the angle members 19 are suitably secured to side angle members 22 which at the rear ends thereof are connected by an angle member 23 and at the front ends by an angle member 24.

The square formed by the side angles 22 and the rear and front angles 23 and 24 forms an operator's station. (See Fig. 3.)

Mounted on the base 13 I show an internal combustion engine 25 of the motorcycle type which includes a fuel carburetor 26 having a fuel feed control arm 27 thereon. Also mounted on the base 13 I provide a power transmission 28 of the motorcycle type which includes a clutch lever 29, a gear shift lever 31 and a reverse lever 30.

The engine 25 includes a drive sprocket 32 and the transmission includes a driven sprocket 33 and a drive sprocket 34. The engine drive sprocket 32 and the driven sprocket of the transmission are connected by an endless chain 35.

Mounted on each of the side channel members 16 of the base 13 I provide leaf springs 36 which are shown as secured to their associated channels by a U bolt 37 and extend beyond the forward end of the base. Mounted on the springs 36 adjacent their forward end I provide a bearing member 38. Journaled in the bearings 38 I provide a shaft 39 having a flanged pulley 40 thereon disposed on the outside of the springs 36. Also mounted on the shaft 39 I provide a sprocket 41 which is adapted to be driven from the sprocket 34 by a chain 42. Furthermore the shaft 39 has a brake drum 43 which is engaged by a standard type brake band 44 which includes an operating member 45 mounted on a shaft 46 secured to brackets 47 mounted on the springs 36. The brake operating member 45 includes an actuating arm 48.

Mounted on a shaft 49 supported in brackets 50 secured to the angle member 24 I provide four control levers 51, 52, 53 and 54. The clutch lever 29 is connected to the control lever 51 by a flexible wire 55 and to the brake actuating lever 48 by a wire 56. The reverse gear lever 30 is connected to the control lever 52 by a flexible wire 57 and the gear shift lever 31 is connected to the control lever 53 by a flexible wire 58. The fuel feed control arm 27 is connected to the control lever 54 by a flexible wire 60.

Normally the brake 44 is in a released position and the clutch is in an engaged position and when the operator moves the clutch control lever 51 to swing the clutch lever 29 to disengage the clutch the wire 56 swings the brake operating lever to tighten the brake band 44.

Adjacent the rear of the device I provide a frame 61 which is pivotally secured as at 62 to bearing blocks 63 on the lower angle members 19. The frame 61 has a bicycle wheel 64 suitably mounted thereon. The frame 61 may be swung up against the frame 12 to an inoperative position as shown in Fig. 1 and secured thereto by a suitable connector member such as indicated at 65 or it may be lowered to a vertical operative position as indicated by the broken lines in Fig. 1 and shown in full in Fig. 2.

At the operator's station I provide a carrying strap 66 the ends of which are suitably secured to the frame angles 22 as at 67.

The device 10 is adapted to drive any standard type of pipe wrapping machine which is rotated to cause it to function. One type of such machine is shown in Figs. 4 and 5 and indicated generally by 70. The machine includes a frame comprising spaced circular side flanges 71 formed of two semicircular members connected by a hinge member 72 and a releasable connector member 73. The side angles 71 are connected by a plurality of longitudinal members 74. The machine 70 includes a paper spool holding device 75 in which a spool of paper 76 is mounted and a distributor spool 77. The machine 70 further includes a plurality of angularly arranged pressure roller devices 78.

In operation the machine 70 is opened, placed over a pipe 79 and then closed. Thereafter bituminous binder or "dope" is placed on the pipe 79. Paper from the spool 76 is threaded over the distributor spool 77 onto the pipe 79 and then the machine 70 is manually rotated. As the machine 70 is thus rotated the paper is wound around the pipe and the angular positions of the devices 78 cause the machine 70 to travel along the pipe thereby winding the paper on the pipe in a spiral form as shown in Fig. 5.

When my improved power drive device 10 is to be used to rotate the machine 70, belt guide members 80 are provided on each of the side angle members 71. As shown the guide members 80 include a plane center portion 81 having angularly arranged side flanges 82 thereon. Extending from the portions 81 I provide bolt members 83 which are welded to the portion 81.

When the machine 70 is used in combination with the device 10 the original belts securing the pressure roller device brackets 85 to the side flanges 71 are removed and the bolts 83 of the devices 80 replace them and are secured to the side flanges 71 by nuts 86. Adjacent the hinge member 72 and the connector member 73 I provide special belt guide members 87 which are similar to the devices 80 except that they include a bracket portion 88 which is secured to the side flange by a bolt 89.

In operation a belt 90 is positioned in the belt guide members 80 and 87 of the machine 70 and in the flanged pulleys of the device 10. (See Figs. 4 and 5.) The forward end of the device 10 is thus suspended from the machine 70 which in turn is supported on the pipe 79 as previously described. The operator then takes his position at the operator's station (previously defined) and places the strap 66 over his shoulders thereby supporting the rear of the device. Thus the device 10 is suspended at the forward end from the machine 70 and at the rear by the operator. After the engine 25 is operating the operator manipulates the clutch and gear shift levers to cause the engine to drive the pulleys 40 as previously described. As the pulleys 40 rotate they drive the belt 90 which in turn rotates the device 70 which operates in the manner previously described. Each of the belts 90 is preferably split with the ends thereof secured together by any standard type of separable connector such as indicated at 91 in Figs. 4 and 6. This allows the belts to be placed in position at any point along the pipe without the necessity of slipping them over one end of the pipe which may be a considerable distance from the point at which the pipe is being wrapped.

The leaf springs 36 allow the pulleys 40 to move up and down to compensate for the irregular action of the belt 90 as it travels over the belt guide members 80 and 87.

When the ground surface permits the frame 61 may be swung to a vertical position wherein the wheel 64 engages the ground and together with the frame 61 supports the rear end of the device 10 thereby eliminating the necessity of the operator supporting the device.

From the foregoing description it will be apparent that I have provided an improved means for driving a pipe wrapping machine which is simple in construction and highly efficient in use.

Having thus described my invention I claim:

1. The combination with a pipe wrapping machine including a frame, a reel support on said frame, means on the frame adapted to rotatably engage a pipe and belt engaging means on said frame, of a power drive device, said power drive device including a base, a prime mover mounted on said base, a pulley on said base and driven by said prime mover and a flexible member engaging said belt engaging means and said pulley to support said pulley and the base, said flexible member being effective to drive said frame about the pipe.

2. The combination of a pipe wrapping machine and a power drive device, said power drive device including a base having an upwardly inclined frame portion thereon, a prime mover mounted on said base, a flexible member mounted on said base and extending forwardly therefrom, said flexible member having a bearing thereon, a shaft journaled in said bearing, a flanged pulley mounted on said shaft, means to drive said shaft from said prime mover, said pipe wrapping machine including a frame member, spaced belt engaging members on said frame member, and a flexible belt member engaging said flanged pulley and said belt engaging members on said frame member.

3. The combination of a pipe wrapping machine, and a power drive device, said power drive device including a base having an upwardly inclined frame portion thereon, an engine mounted on said base, a pair of spaced flexible members mounted on said base and extending forwardly therefrom, each of said flexible members having a bearing thereon, a shaft journaled in said bearings, a pair of spaced flanged pulleys mounted on said shaft, means to drive said shaft from said engine, a pair of sets of spaced circumferentially arranged belt engaging members on said pipe wrapping machine, and a flexible belt member engaging each of said flanged pulleys and said belt engaging members on said pipe wrapping machine.

WILLARD C. ROBINETTE.